April 2, 1929.  S. F. DE CASTRO É IZNAGA  1,707,256
SHOCK ABSORBER WHEEL
Filed March 9, 1926    4 Sheets-Sheet 1
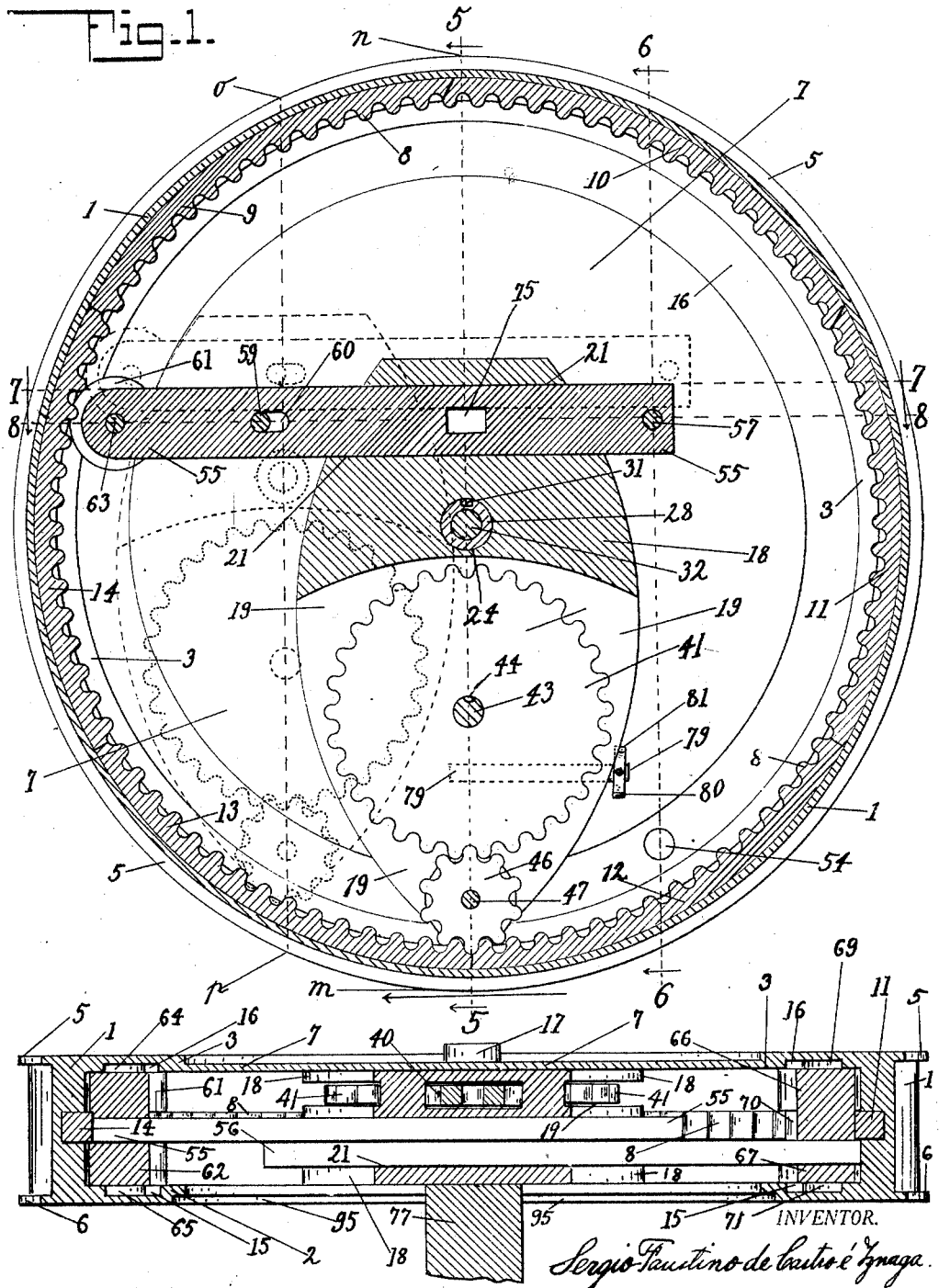

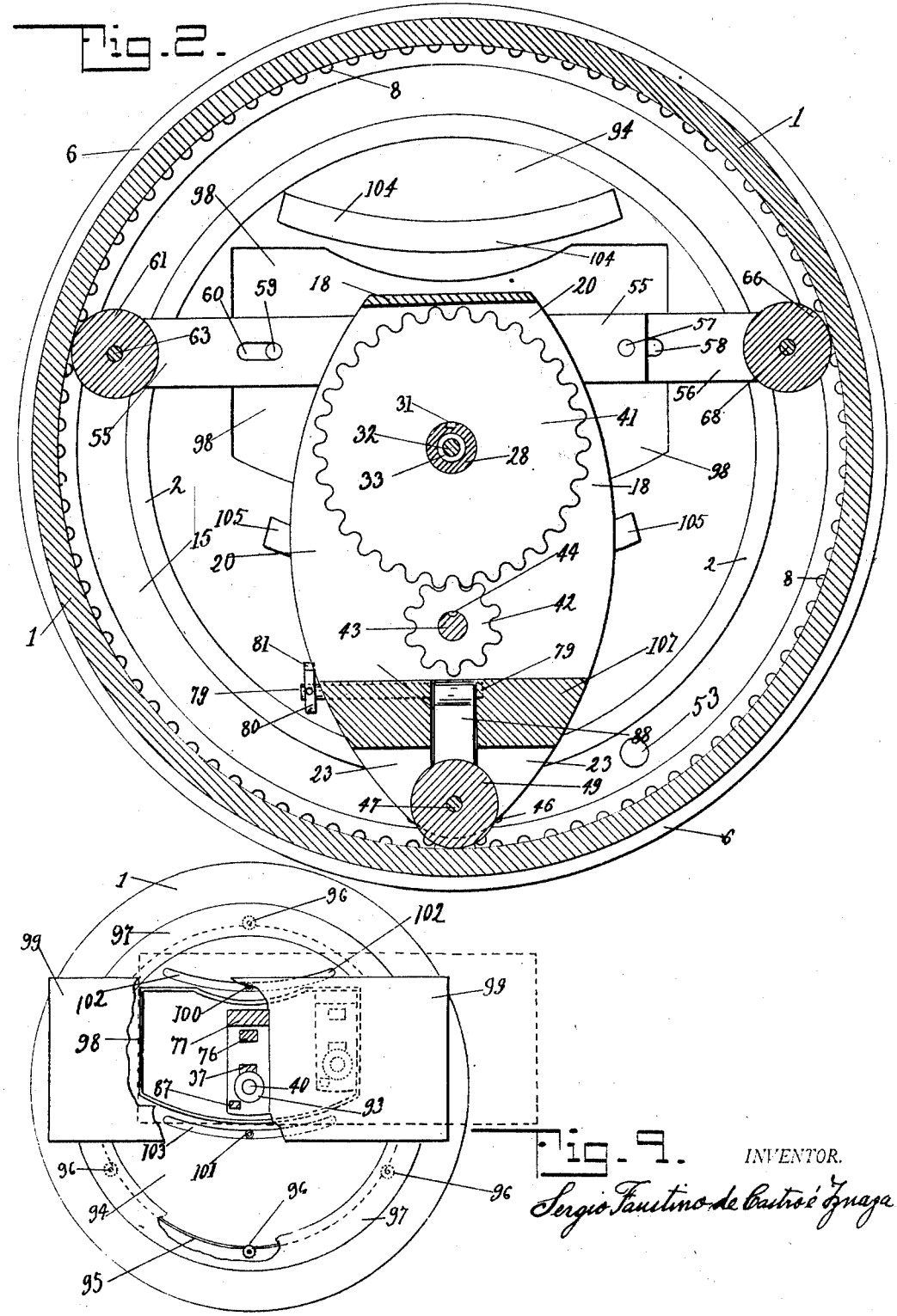

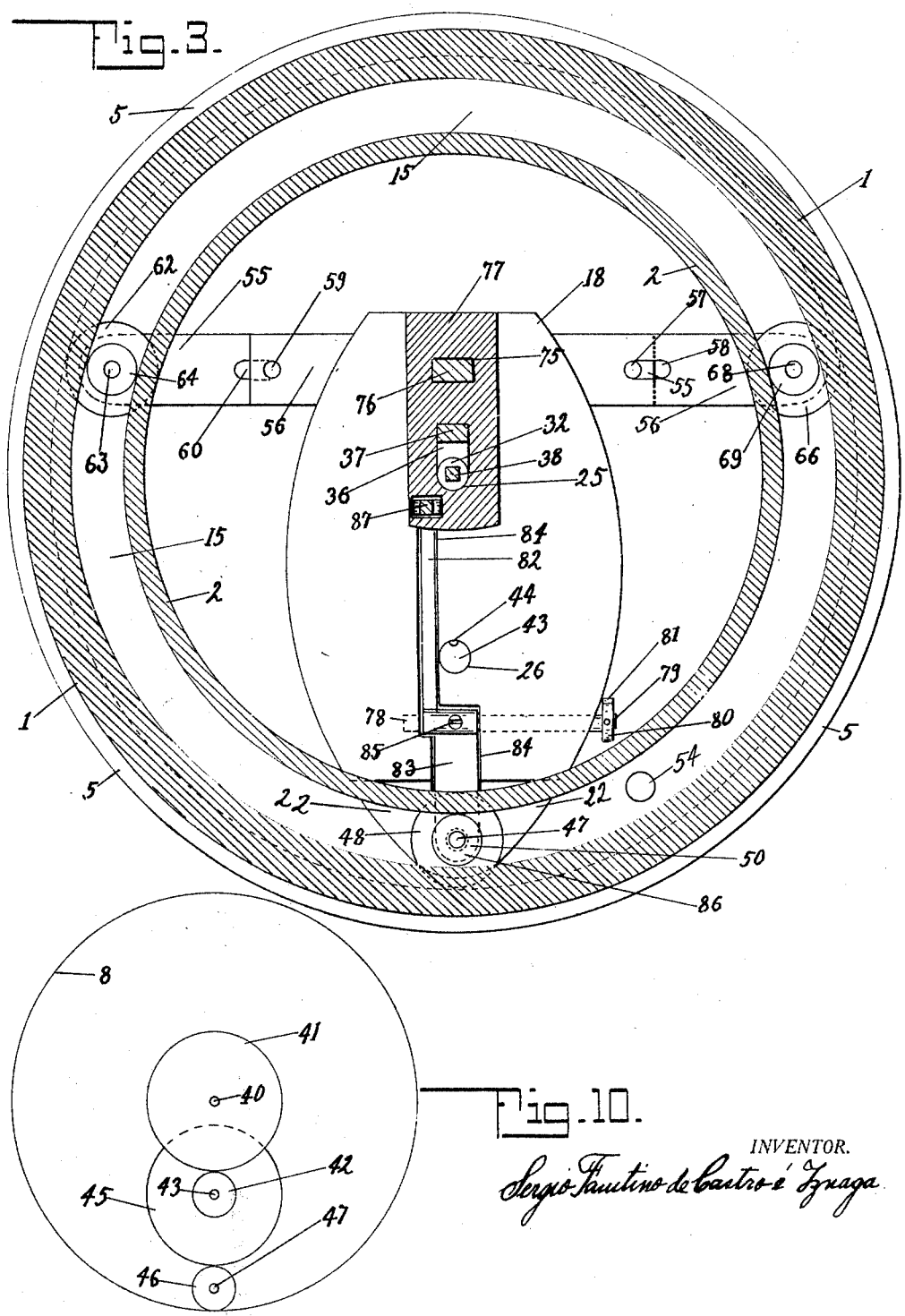

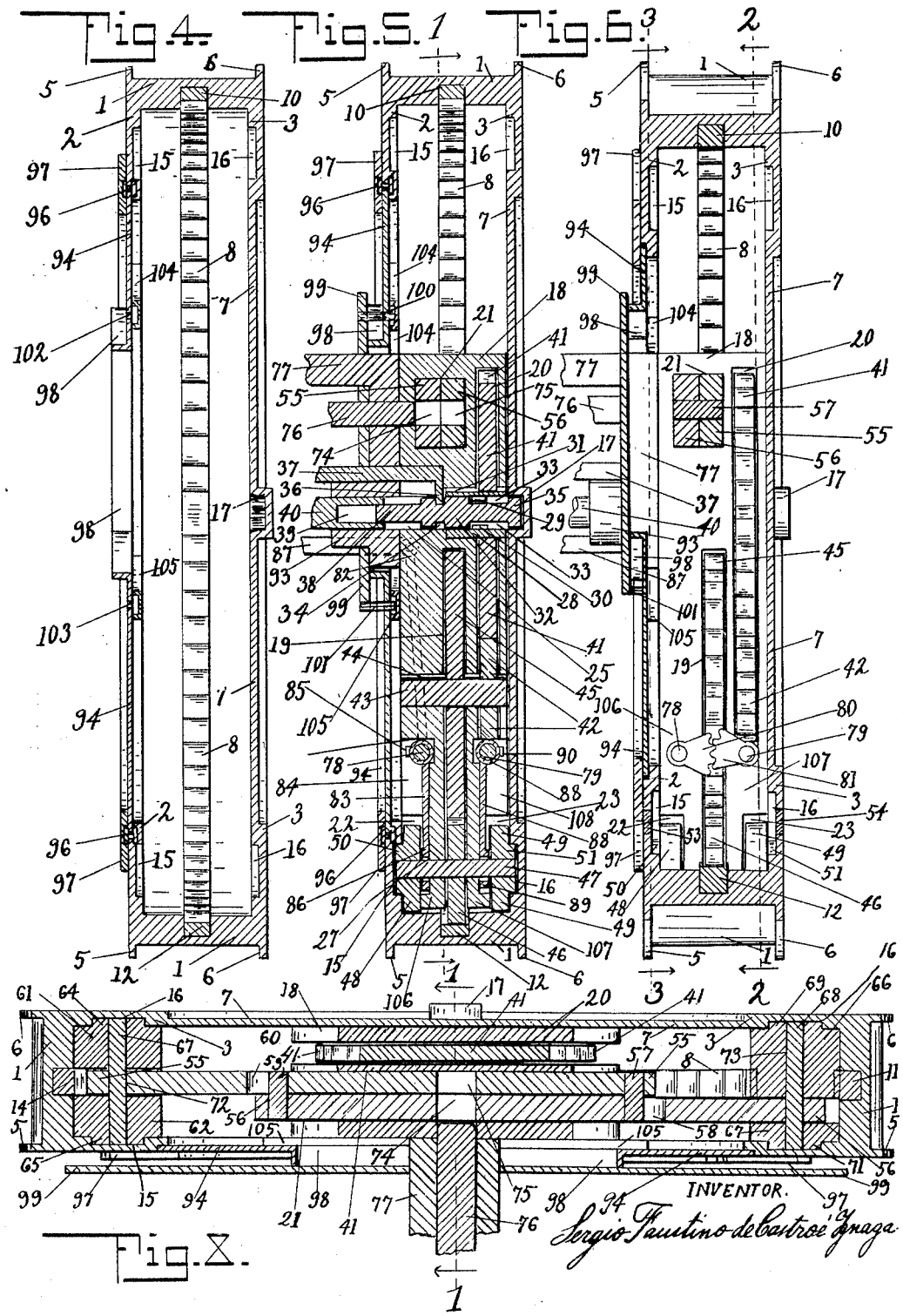

Patented Apr. 2, 1929.

1,707,256

UNITED STATES PATENT OFFICE.

SERGIO FAUSTINO DE CASTRO É IZNAGA, OF HABANA, CUBA; JUAN DE CASTRO Y PLANS AND CARMEN YZNAGA Y RUIZ HEIRS OF SAID SERGIO FAUSTINO DE CASTRO É YZNAGA, DECEASED.

SHOCK-ABSORBER WHEEL.

Application filed March 9, 1926. Serial No. 93,437.

My invention relates to improvements in wheels for vehicles, specially in wheels without spokes described and claimed in my American Patent No. 1,566,467, dated Dec. 22. 1925; and the objects of said improvements are, first, to provide means to apply the wheel to a car without interfering with the shock-absorber device; second, to provide means to convey the motion from a turning shaft to the wheel; third, to afford facilities for applying at will the motion either to the center of the wheel in the common way or to the rim of the wheel through proper gearing; fourth, to afford facilities to allow the wheel to turn loosely; fifth, to provide a brake for checking the rolling of the wheel when needed; and sixth, to provide a proper cover to protect the inside of the wheel against dust.

I attain these objects by the mechanism illustrated in the accompanying drawing in which—

Fig. 1 is a vertical section of the wheel and the stand seen from the car on the line 1—1 in Fig. 5; Fig. 2 is a vertical section of the wheel and the stand on the line 2—2 in Fig. 6; Fig. 3 is a vertical section of the wheel and the stand, seen from the car, on the line 3—3 in Fig. 6; Fig. 4 is vertical section of the wheel without the stand, on the line 5—5 in Fig. 1; Fig. 5 is a vertical section of the wheel and the stand on the line 5—5 in Fig. 1; Fig. 6 is a vertical section of the wheel and the stand on the line 6—6 in Fig. 1; Fig. 7 is a horizontal section of the wheel and the stand on the line 7—7 in Fig. 1; Fig. 8 is a horizontal section of the wheel and the stand on the line 8—8 in Fig. 1; Fig. 9 is a reduced view of the wheel, seen from the car, as it appears after the removal of a portion of the board that closes the outlet of the protecting cover; and Fig. 10 is a schematic view of the gearing that conveys the motion from a turning shaft to the rim of the wheel.

Similar numerals refer to similar parts throughout the several views.

In the drawings 1 is the rim of a wheel, 2 and 3 are two inwardly extending flanges integral with the rim 1. 5 and 6 are two short outward flanges integral, too, with the rim 1 and adapted to receive and hold a pneumatic or a massive rubber tire in the common way. 7 is a flat disc which may be integral with the flange 5 and serves to close the outer side of the wheel. There is a groove cut all around the middle of the inner periphery of the rim 1 adapted to receive a crown of gearing teeth 8, which is divided into a number of sections, 9, 10, 11, 12, 13, and 14. To facilitate the setting in place of the toothed crown 8 into the groove the cuts between the ends of sections 11 and 12, 12 and 13, 13 and 14, 14 and 9 are radial, while the cuts between the ends of sections 9 and 10, and 10 and 11 are parallel to each other to allow the setting in place of section 10 after the other sections are set.

These sections 9, 10, 11, 12, 13, and 14 are secured in place by any suitable means not shown in the drawings.

A wide groove 15 is cut all around the inner face of the inwardly extending flange 2, and a similar groove 16 is cut all around the inner face of the opposite flange 3.

The disc 7 is provided with a protruding cylinder 17 occupying its center which is also the center of the wheel. The inner side of the disc 7 has a slightly conical concavity extending into the protruding cylinder 17 and adapted to receive the slightly conical end of an advancing and retracting axle, both the concavity and the end of the axle being striated or toothed to form a clutch.

18 is a stand which serves as framework for the gearing. A large cut 19 divides the lower portion of said stand 18 into two halves 106 and 107. A mortise 20 passes through the upper portion of the stand 18 and its outer half 106; and a shorter but wider mortise 21 passes only through the upper portion of said stand 18.

The outer faces of both halves 106 and 107 of the lower portion of the stand 18 are rabbeted into two recesses 22 and 23.

A bore 24—25 passes through the stand 18 near the two thirds of its height; the portion 24 being of larger diameter than the portion 25.

Another bore 26 passes through both halves 106 and 107 of the stand 18 near one third of its height; and a smaller bore 27 passes through the lower end of both halves 106 and 107.

A short cylinder 28, whose inner diameter is the same as the diameter of the portion 25, can turn within the bore 24, and it is provided with a number of internal teeth 29 and 30 and has an external groove 31.

A slidable axle 32 has two grooves cut all around it, one wide 33, and the other one narrow 34; and its end is provided with a slightly conical head 35 which can enter into the concavity of the cylinder 17 when the axle 32 is slid outwardly acting then as a clutch. Said head 35 is provided with proper grooves, not shown in the drawings, adapted to receive and engage the teeth 29 and 30 when the axle 32 is slid inwardly.

A finger 36, integral with the sliding bar 37, enters into the groove 34 of the axle 32 and serves to slide out and in said axle 32 within the bore 25 and the inside of the cylinder 28.

The short axle 32 has a stem 38, of square cross-section, which enters into a mortise 39 of similar cross-section made in the end of a rotatable shaft 40.

A spur-gear 41, within the mortise 20, is slidably mounted on the cylinder 30, and as the central bore of said spur-gear 41 is provided with a projecting edge which enters through the groove 31 of the cylinder 30, when this latter turns, the spur-gear 41 turns with it.

The spur-gear 41 meshes with a toothed pinion 42, which is within the mortise 20, too, and slidably mounted on an axle 43 provided with a longitudinal groove 44 through which passes a lug projecting from the inner face of the central bore of the pinion 42.

A spur-gear 45, similar to the spur-gear 46, within the cut 19 is slidably mounted on the axle 43 and has a lug projecting from its central bore holding in the groove 44 so that when the axle 43 turns both the pinion 42 and the spur-gear 45 will turn with it.

The spur-gear 45 meshes with a toothed pinion 46, within the cut 19, loosely mounted on an axle 47 passing through the bore 27. This toothed pinion 46 meshes with the toothed crown 8.

In this way, if the slidable axle 32 is slid inwardly, its head 35 engages the teeth 29 and 30 of the cylinder 28 and when the shaft 40 turns the motion is conveyed through the stem 38 to the slidable axle 32 and from this latter, through the head 35, which is in meshing with the teeth 29 and 30, to the cylinder 28 and the spur-gear 41; from the spur-gear 41 to the pinion 42 which turns together with the axle 43 thus conveying the motion to the spur-gear 45 and from this latter through the intermediary toothed pinion 46 to the toothed crown 8 of the rim 1, thus causing the wheel to roll on the ground.

The ratio of the gears is such that for every revolution of the shaft 40 there is one revolution of the wheel periphery.

When the slidable axle 32 is slid out into the position shown in Fig. 5, its head 35 clutches into the cavity of the cylinder 17 and if the shaft 40 turns the motion is conveyed through the slidable axle 32 directly to the center of the wheel causing it to turn at the same rate than when moved through the gearing, to wit: making one turn for every one turn of the shaft 40.

If the slidable axle 32 is slid only until its head 35 stops midway between the teeth 29—30 and the cylinder 17 when the shaft 40, together with the slidable axle, 32, turns the motion is conveyed neither to the cylinder 28 nor to the cylinder 17 and then the wheel can turn freely.

When the head 35 is not engaging the teeth 29 and 30 the cylinder 28 can turn loosely within the bore 24 and around the axle 32; then if the wheel turns the toothed crown 8 causes the intermediary pinion 47 to turn and convey the motion to the gear 45 which, through the axle 43 causes the pinion 42 to turn and convey the motion to the spur-gear 41 securely mounted on the cylinder 28 which now can turn loosely on the axle 32.

Two rollers, 48 and 49, are loosely mounted on the ends of the axle 47 filling respectively the recesses 22 and 23 of the lower portion of the stand 18.

The roller 48 has a portion of reduced diameter 50, which enters into the groove 15; and the roller 49 has a portion of reduced diameter 51 which enters into the groove 16.

53 is a bore made through the flange 2 in a point of the middle line of the groove 15; and 54 is a similar bore made through the flange 3 in a point of the middle line of the groove 16. Both the bores 53 and 54 are opposite one another exactly in alinement; and they may be threaded, so that they can be plugged by threaded plugs.

To set in place the pinion 46 and the rollers 48 and 49 it is necessary to bring the bores 53 and 54 in alinement with the bore 27 of the stand 18. The roller 48 is set in place first by passing the axle 47 from the outside through the bore 53, the centre-bore of said roller 48 and the portion of the bore 27 passing through the lower portion of the half 106 of the stand 18; then through the centre bore of the pinion 46 and through the other portion of the bore 27 in the half 107 of the lower portion of the stand 18; and finally through the centre bore of the roller 49.

When the rollers 48 and 49 are set in place and secured by the axle 47, as shown in Fig. 5, their portions of reduced diameter 50 and 51 held within the grooves 15 and 16 respectively, prevent the separation of the stand 18 from the rim 1.

55 and 56 are two slidable arms mounted within the horizontal mortise 21 and touching one another.

The arm 55 has a peg 57 which enters and plays in a lengthened bore 58 made through the arm 56; and this latter has a peg 59 which enters and plays in a lengthened bore 60 made through the arm 55.

61 and 62 are two rollers loosely mounted on the ends of the axle 63 which tightly passes through the bore 72 made in the end of the arm 55. The roller 61 has a portion of reduced diameter 64 which enters into the groove 16; and the roller 62 has a portion of reduced diameter 65 which enters into the groove 15.

66 and 67 are two rollers loosely mounted on the ends of the axle 68 which tightly passes through a bore 73 made in the end of the arm 56. The roller 66 has a portion of reduced diameter 69 which enters into the groove 16 and another portion 70 whose diameter is larger than that of the portion 69, but smaller than that of the portion 66, intended to make way for the teeth of the crown 8.

The roller 67 has a portion of reduced diameter 71 which enters into the groove 15.

To set in place the rollers 66 and 67, the bore 73 of the arm 56 is brought into alinement with the bores 53 and 54; the roller 66, with its portion 69 within the groove 16 is slid until its centre bore is in alinement too with the others and then the axle 68 is passed from the outside through the bore 54, the centre bore of the roller 66 and the bore 73 of the arm 56. Now the roller 67 with its portion of reduced diameter 71 within the groove 15 is slid until its centre bore is in alinement with the bore 73, then the axle 68 is passed into said centre bore of the roller 67.

To set in place the rollers 61 and 62, the bore 72 of the arm 55 is brought into alinement with the bores 53 and 54; the roller 61 with its portion of reduced diameter 64 within the groove 16 is slid until its centre bore is in alinement with said bore 54 and then the axle 63 is inserted from the outside through the bore 54 and the centre bore of the roller 61 and then through the bore 72 of the arm 55; then the roller 62 with its portion of reduced diameter 65 within the groove 15 is slid until its centre bore is in alinement with the bore 72, then the end of the axle 63 is passed into said centre bore.

Now the bores 53 and 54 are plugged in order to prevent the introduction of dust therethrough.

When the rollers 61 and 62; and 66 and 67 are set in place, the outer ends of the arms 55 and 56 cannot be separated from the rim 1. Thus if the stand 18 is brought into the position shown by dotted lines in Fig. 1, the arms 55 and 56 slide a little one toward the other while the stand 18 moves sliding against them and the rollers 61 and 62; and 66 and 67 roll a little upwardly against the upper portion of the inner periphery of the rim 1. During this motion the peg 57 slides from the outer to the inner end of the lengthened bore 58 and the peg 59 slides from the outer to the inner end of the lengthened bore 60.

The arm 56 is provided with a mortise 74 cut midway between its peg 59 and its lengthened bore 58; and the arm 55 has a similar mortise 75 cut midway between its peg 57 and its lengthened bore 60. Those mortises 74 and 75 are adapted to receive the end of a slidable wedge 76 which serves to secure against motion the arms 55 and 56 when desired.

77 is a piece which serves to secure the stand 18 to the chassis of a car to which the wheel is applied.

78 and 79 are two parallel axes journally encased within two horizontal bores made respectively through each one of the halves 106 and 107 of the lower portion of the stand 18. A toothed sector 80, securely mounted on the outer end of the axle 78, meshes with a similar toothed sector 81 securely mounted on the outer end of the axle 79. A lever, comprising a downward arm 82 and an upward arm 83, is securely mounted on the axle 78. This lever 82—83 can make a little swinging motion within a recess 84 cut in the face of the half 106 of the lower portion of the stand 18. A screw 85 serves to secure the lever 82—83 to the axle 78. The lower end of the arm 83 is provided with a ring 86 whose inner diameter is larger than that of the axle 47 in order not to touch it. This ring 86 touches the inner face of the roller 48 as shown in Fig. 5 so that when the upper end of the arm 82 is pushed in, the ring 86 of the end of the arm 83 presses the roller 48 against the flange 2. A slidable bar 87 connected to the upper end of the arm 82 serves to actuate the lever 82—83.

An arm 88 securely mounted on the axle 79 can swing a little within a recess 108 cut in the outer face of the half 107 of the lower portion of the stand 18 and is provided with a ring 89 whose inner diameter is larger than that of the axle 47 in order not to touch it. A screw 90 serves to secure the arm 88 to the axle 79.

Now, when the arm 82 is pushed in by the bar 87 it causes the axle 78 to turn a little and the toothed sector 80 causes the toothed sector 81 to turn a little in the opposite direction whereby the arms 83 and 88 will separate causing their rings 86 and 89 to press respectively the rollers 48 and 49 thrusting them against the flanges 2 and 3 of the rim 1 thus acting as a brake for the wheel.

91 and 92 are two screws which serve to secure respectively the toothed sectors 80 and 81 to the axles 78 and 79.

93 is a protruding cylindrical prolongation of the piece 77 intended to afford a bearing for the end of the shaft 40.

94 is a cover intended to protect the inside of the wheel against dust. This cover 94 is a disc encased within a circular rabbet 95, cut all around the outer edge of the flange 2.

96 represent anti-friction rollers provided around the rabbet 95 to facilitate the rotation of the flange 2 around the periphery of the cover 94. This periphery of the cover 94 and the rabbet 95 are covered by a ring 97 secured on the face of the flange 2.

The cover 94 is provided with a flanged outlet 98 intended to afford a passage for the piece 77, the shaft 40, the edge 76, the bar 37 and the bar 87. A board 99 secured on the piece 77 closes the entrance of the outlet 98. The middle line of the inner face of the board 99 is provided with two pins with anti-friction rollers 100 and 101 which enter and play respectively in two grooves 102 and 103 cut in the cover 94. Those rollers 100 and 101 are intended to prevent any possible rotation of the cover 94.

Now it is easy to see that if the wheel is stopped by an obstacle on its way when it is rolling on the ground in the direction shown in Fig. 1 by a large arrow, the rollers 48 and 49 will climb rolling up the smooth slope from the point $m$ to the point $p$ on the inner periphery of the rim 1 the stand 18 changing from its position on the vertical diameter $mn$ to the position shown by dotted lines on the vertical chord $op$, drawn both by the toothed pinion 46 which rolls meshing with the sloped toothed crown 8, and by the momentum of the car. But as the point $p$ is above the crest of the obstacle and the car continues advancing the rim 1 will take slowly an advanced position until the stand 18 will be again on the vertical diameter; thus absorbing the shock that the obstacle could have caused.

If instead of an obstacle the wheel meets a deep hole in the road, as soon as the rollers 48 and 49 press down the rim 1 when it is balanced on the edge of the hole the wheel will fall rolling into the hole while the rollers 48 and 49 will roll down the smooth slope of the inner periphery of the rim 1 until reaching the lower end of the vertical diameter and then will climb up the other side of the inner periphery of the rim 1 and when they reach the point of said periphery above the opposite crest of the hole their pressure on said rim 1 will cause the wheel to roll out of the hole balancing on the edge of the crest of said hole, thus absorbing the shock that the deep hole could have caused.

What I claim is:

1. In a shock-absorber wheel, a rim provided with two inwardly extending flanges each having a wide groove cut all around its inner face, in combination with a stand provided with two rollers loosely mounted on the ends of a horizontal axle passing through a bore made in its lower end; each of said rollers having a portion of reduced diameter adapted to enter respectively into the groove cut in the inner face of one of the inwardly extending flanges of the rim to prevent the separation of the lower end of the stand from the rim.

2. In a shock-absorber wheel, a rim provided with two inwardly extending flanges, each having a wide groove cut all around its inner face; and a stand provided with two rollers loosely mounted on the ends of a horizontal axle passing through a bore made in its lower portion; each of said rollers having a portion of reduced diameter adapted to enter respectively into the groove cut in the inner face of one of the inwardly extending flanges of the rim; in combination with means to force both rollers respectively against each of the inwardly extending flanges of the rim to cause them to act as brakes for checking the rolling of the wheel on the ground.

3. In a shock-absorber wheel, a rim provided with two inwardly extending flanges each having a wide groove cut all around its inner face; and a stand provided with two rollers loosely mounted on either end of a horizontal axle passing through a bore made in its lower portion, each of said rollers having a portion of reduced diameter adapted to enter into the groove of one of the inwardly extending flanges of the rim; in combination with two swinging arms encased within two recesses cut in each face of the lower portion of the stand and respectively mounted on one of two parallel axles passing through horizontal bores made in the lower portion of the stand perpendicularly to the direction of axle of the rollers; two meshing toothed sectors securely mounted on the outer ends of the parallel axles adapted to convey the motion from one of the parallel axles to the other one; an upper arm securely mounted on one of said parallel axles and connected by its upper end with a bar adapted to press in or pull out the end of said upward arm; and two rings integral with the lower end of each of the swinging arms adapted to press the above named rollers against the inwardly extending flanges of the rim to cause them to act as brake for checking the rolling of the wheel on the ground.

4. In a shock-absorber wheel, a rim provided with two inwardly extending flanges each having a wide groove cut in its inner face; in combination with a stand provided with two rollers loosely mounted on the ends of a horizontal axle passing through a bore made in its lower end, also provided with two slidable arms passing through a horizontal mortise cut in the upper portion of said stand; each slidable arm provided with two rollers loosely mounted on an axle passing through a bore made in its end; each of said rollers having a portion of reduced diameter adapted to enter into the groove cut in the inner face of one of the inwardly extending flanges of the rim to prevent the ends of the slidable arms from separating from the rim of the wheel.

5. In a shock-absorber wheel; a rim provided with two inwardly extending flanges, each having a wide groove cut in its inner face; a stand provided with two rollers loosely mounted on the ends of an axle passing through a bore made in its lower end; and two horizontal slidable arms each provided with two rollers loosely mounted on either end of a horizontal axle passing through a bore made in its end; and provided too with a peg which enters and plays in a lengthened bore made in the other slidable arm, and a mortise cut through both slidable arms; in combination with a slidable lug adapted to enter into said mortises cut in the slidable arms to prevent their motion.

6. In a shock absorber wheel, a rim provided with two inwardly extending flanges, a flat disc integral with one of said flanges and provided on its center with a protruding cylinder whose inner base has a slightly tapered bore; in combination with a slidable axle provided with a silghtly tapered head adapted to enter into the above-named bore to form a clutch.

7. Is a shock-absorber wheel, a rim provided with two inwardly extending flanges, a circular rabbet cut all around the outer edge of the innermost of said flanges; in combination with a round covering-disc encased within said rabbet, antifriction rollers around the rabbet to facilitate the rotation of the flange on the periphery of the covering-disc, and a ring secured on said flange covering the rabbet and the periphery of the covering-disc.

8. In a shock absorber wheel, a rim provided with two inwardly extending flanges, a covering-disc encased within a circular rabbet cut all around the outer edge of one of said flanges and provided with antifriction rollers to facilitate the rotation of the flange around the periphery of the covering-disc, said disc provided with a flanged outlet; in combination with an arm adapted to secure the inner mechanism of the wheel to the chassis of a car, passing through said flanged outlet, and bearing a board that closes the entrance of said outlet, said board provided with two antifriction rollers that play within two arcuate grooves cut in the covering-disc to prevent any possible rotation of the disc.

9. In a shock absorber wheel a rim provided with an inner toothed crown; in combination with a vertical train of gearing whose lower pinion constantly meshes with said toothed crown and is adapted to climb up the slope of the inner face of the above-named rim to either side out of the vertical diameter of the wheel.

10. In a shock absorber wheel, a rim provided with an inner toothed crown whose lower portion meshes with a vertical train of gearing; in combination with a slidable axle adapted to connect said vertical train of gearing with a turnable shaft.

SERGIO FAUSTINO de CASTRO é YZNAGA.